3,022,270
N-(HETEROCYCLIC SUBSTITUTED ALKYLIDENE)
AMINO - ALKYLSILICON COMPOUNDS AND
PROCESS FOR PRODUCING THE SAME
Robert J. Lisanke, Buffalo, N.Y., assignor to Union Carbide Corporation, a corporation of New York
No Drawing. Filed June 27, 1958, Ser. No. 744,901
17 Claims. (Cl. 260—46.5)

This invention relates to new and useful organosilicon compounds. More particularly, the invention relates to organosilicon compounds containing a N-(heterocyclic substituted alkylidene) aminoalkylsilyl grouping wherein the amino group is interconnected to the silicon atom of the silyl grouping through at least three carbon atoms, as new compositions of matter and to a process for producing them.

The compositions of the instant invention are organosilicon compounds which contain at least one silicon atom and N-(heterocyclic substituted alkylidene) aminoalkylsilyl grouping as represented by the formula:

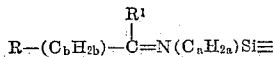

wherein $R^1$ is a hydrocarbyl group or a hydrogen atom, $a$ is an integer having a value of at least 3 and preferably from 3 to 9 inclusive, $b$ is an integer having a value of from 0 to 3 inclusive, and R is a monovalent heterocyclic group containing no heterocyclic ring of less than 5 atoms and composed of carbon, hydrogen and from 1 to 2 heterocyclic atoms, said heterocyclic group containing no other heterocyclic atoms than nitrogen and oxygen, each silicon atom of the organosilicon compound is bonded to from 1 to 3 oxygen atoms, each silicon bonded oxyen atom being bonded to either a silicon atom or a carbon atom of an alkyl group and each remaining unfilled valence of all silicon atoms is satisfied by no other group than a hydrogen atom or a hydrocarbyl group. Such heterocyclic groups include those containing one nitrogen atom in the ring, e.g. pyridyl, indolyl, acridinyl, pyrryl, piperidinyl, quinolinyl and the like; those containing one oxygen atom in the ring, e.g. furyl, benzofuryl, pyranyl, xanthyl and the like; those containing two nitrogen atoms in the ring, e.g. indazyl, pyrimidyl, pyrazyl, cinnolinyl, quinazolyl, phenazinyl, pyrazolyl and the like; those containing two oxygen atoms in the ring, e.g. para-dioxin and the like; and those containing one oxygen atom and one nitrogen atom in the ring, e.g. 1,4-oxazinyl, benzoxazinyl, benzisoazolyl, oxazolyl, isooxazolyl and the like. Such heterocyclic groups also include those that contain a single heterocyclic ring such as furyl, pyrryl, pyridyl and the like as well as those containing fused rings such as, for example, 1,2-benzopyranyl, indazyl, indolyl, naphthyridinyl, pyrido(3-2-b)-pyridinyl, carbazyl, acridinyl, quinolinyl and the like. By the term "hydrocarbyl group," as used herein, is meant a monovalent hydrocarbon radical.

Compositions of this invention which are monomeric are the organosilanes represented by the formula:

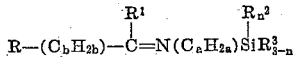

wherein R, $R^1$, $a$ and $b$ have the above-defined meanings and $R^2$ represents a hydrocarbyl group or a hydrogen atom, $R^3$ represents an alkoxy group and $n$ is an integer of from 0 to 2. The organosilanes which are monofunctional in regard to the silicon atom (i.e. where $n=2$) are, for example, gamma-N-(indazylmethylidene)aminopropylidiethylethoxysilane, gamma-N-(benzofurylmethylidene)aminopropyldiphenylpropoxysilane and the like. Organosilanes which are difunctional in regard to the silicon atom (i.e. where $n=1$) are, for example, delta-N - (pyridylmethylidene)aminobutylmethyldiethoxysilane, gamma - N - (acridinylmethylidene)aminopropylphenyldimethoxysilane and the like. Organosilanes which are trifunctional in regard to the silicon atom (i.e. where $n=0$) are, for example, delta-N-(pyridylmethylidene)aminobutyltriethoxysilane, delta - N - [quinolinyl-(methyl)methylidene]aminobutyltributoxysilane, gamma-N-(piperidinylmethylidene)trimethoxysilane and the like.

The compositions of this invention which are polymeric are the organosiloxanes as represented by the formula:

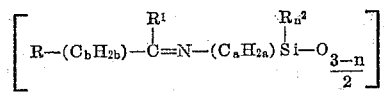

wherein R, $R^1$, $R^2$, $a$, $b$ and $n$ have the above-defined meanings. The organosiloxanes of this invention that are trifunctional in regard to the silicon atom (i.e. where $n=0$) include crosslinked organopolysiloxanes, for example, delta - N - (furylmethylidene)aminobutylpolysiloxane, gamma - N - (indolylmethylidene)aminopropylpolysiloxane and the like. Organosiloxanes of this invention which are difunctional in regard to the silicon atom (i.e. where $n=1$) include the linear organosiloxanes, for example, gamma - N - (pyrrylmethylidene)aminopropylmethylpolysiloxane, delta - N - (benzofurylmethylidene)-aminobutylphenylpolysiloxane and the like. The organosiloxanes which are difunctional in regard to the silicon atom (i.e. where $n=1$) also include cyclic organosiloxanes of the formula:

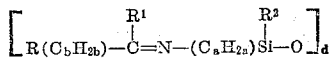

wherein R, $R^1$, $R^2$, $a$ and $b$ have the above-defined meanings and $d$ is an integer of from 3 to 7. These cyclic organosiloxanes are, for example, tetra gamma-N-(acridinylmethylidene)aminopropyltetraethylcyclotetrasiloxane, penta-delta - N - (indolylmethylidene)aminobutylpenta-phenylcyclopentasiloxane, hepta-gamma-N-(quinolinylmethylidene)aminopropylhepta - ethylcycloheptasiloxane and the like. The organosiloxanes of this invention which are monofunctional in regard to the silicon atom (i.e. where $n=2$) are the dimeric organosiloxanes, for example, bis-gamma-N-(indazylmethylidene)aminopropyldimethyldisiloxane, bis-delta - N - (pyridylmethylidene)-aminobutyldiphenyldisiloxane and the like.

Compositions of this invention which are copolymeric are those copolymeric organosiloxanes containing the units represented by the formulae:

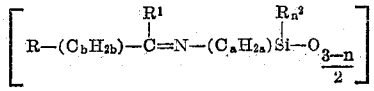

and

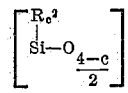

wherein R, $R^1$, $R^2$, $a$, $b$ and $n$ have the above-defined meanings and $c$ is an integer having a value of from 0 to 3, $c$ need not have the same value throughout the same molecule, $n$ need not have the same value throughout the same molecule and $R^2$ can represent the same or different groups within the same molecule. Thus, the copolymeric organosiloxanes of this invention include end-blocked linear copolymeric organosiloxane oils, copolymeric cyclic organosiloxanes and copolymeric resinous organosiloxanes containing the same or different substituted mono-, di- and tri-functional silicon atoms or the organosiloxanes of this invention can exist as copolymeric difunctional organosiloxane gums. Such copolymeric organosiloxane oils are those having the formula:

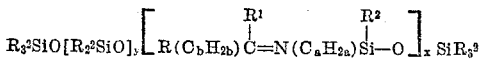

wherein R, $R^1$, $R^2$, $a$ and $b$ have the above-defined meanings, $y$ is an integer and $x$ is an integer of at least 1, and $R^2$ represents the same or different groups in the same molecule within its meaning as defined above. Such copolymeric organosiloxane oils are, for example, trimethylsiloxy end-blocked dimethylsiloxane - gamma - N - (acridinylmethylidene) aminopropylphenylsiloxane oil, triphenylsiloxy end-blocked diphenylsiloxane-delta-N-(furfurylidene)aminobutylmethylsiloxane, tributylsiloxy end-blocked phenylmethylsiloxane-omega-N-(indazylmethylidene)aminoundecylmethylsiloxane oil and the like. Such copolymeric cyclic organosiloxanes are, for example, gamma - N - (furylethylidene)aminopropylheptamethylcyclotetrasiloxane, delta-N-(indolylmethylidene)-aminobutylpentaphenylcyclotrisiloxane, gamma-N-(pyrryl(ethyl)methylidene)aminopropyl nona-methylcyclopentasiloxane and the like. Such copolymeric resinous organosiloxanes are, for example:

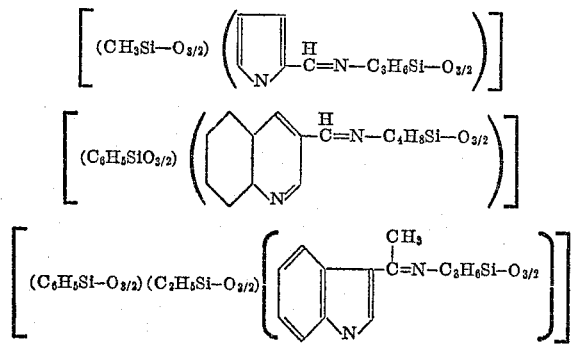

and the like.

In accordance with my invention, the new compounds thereof are prepared by reacting an aldehyde or ketone containing a heterocyclic group with an organosilicon compound containing an aminoalkylsilyl grouping wherein the amino group is interconnected to the silicon atom by at least 3 carbon atoms. The overall reaction is depicted by the following equation:

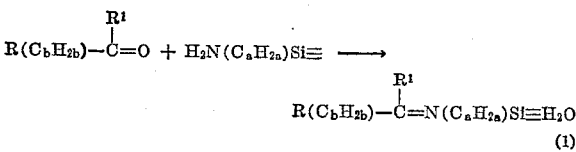

where R, $R^1$, $a$ and $b$ have the above-defined values.

The organosilicon compounds containing an aminoalkylsilyl grouping that are useful as starting materials in the preparation of the compositions of this invention are those which contain units of the formula:

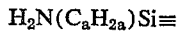

wherein $a$ has the above-defined meaning and the remaining unfilled valences of the silicon are satisfied in the manner described above. Thus, for example, these organosilicon compounds containing an aminoalkylsilyl grouping are monomeric, polymeric or copolymeric.

The monomeric organosilicon compounds containing an aminoalkylsilyl grouping that are useful in preparing the composition of this invention are the aminoalkylsilanes depicted by the formula:

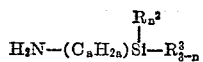

wherein $R^2$, $R^3$, $n$ and $a$ have the above-defined meanings. Examples of such aminoalkylsilanes are gamma-aminopropyltrimethoxysilane, gamma - aminopropylmethyldiethoxysilane, gamma - aminopropyldiphenylmethoxysilane, omega-aminoundecenyltriethoxysilane and the like.

The polymeric organosilicon compounds containing an aminoalkylsilyl grouping that are useful in preparing the compositions of this invention are the aminoalkylsiloxanes depicted by the formula:

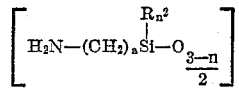

where $R^2$, $a$ and $n$ have the above-defined meaning. These materials can be cyclic aminoalkylsiloxanes as well as linear aminoalkylsiloxanes as, for example, where $n$ is 1, the compounds can be in the cyclic form having from 3 to 7 such units or they can be linear having a number of such groupings. These polymeric materials can be prepared by the hydrolysis and condensation of the corresponding alkoxysilanes. Illustrative of the cyclic aminoalkylsiloxanes suitable for use as starting materials are, for example, tetra-gamma-amino-propyltetramethylcyclotetrasiloxane, tetra-(delta-aminobutyl)tetraphenylcyclotetrasiloxane and the like. Illustrative of the linear aminoalkylpolysiloxanes are gamma-aminopropylphenylpolysiloxane, delta-aminobutylmethylpolysiloxane, delta-aminobutylethylpolysiloxane and the like. Where $n$ is 0 in the above formula, the materials are of the trifunctional variety, such as, for example, gamma-aminopropylpolysiloxane, delta-aminobutylpolysiloxane and the like. These aminoalkylsiloxanes can have residual alkoxyl groups in the siloxane chains. Such aminoalkylsiloxane containing residual alkoxy groups can be prepared by the partial hydrolysis and condensation of the corresponding aminoalkylalkoxysilanes.

The copolymeric organosilicon compounds containing an aminoalkylsilyl grouping that are useful in preparing the compositions of this invention are those containing the units:

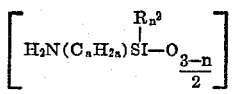

and

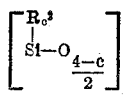

where $R^2$, $a$, $c$ and $n$ have the above-described values. The copolymeric materials suitable for the preparation of the compositions of this invention can contain various combined siloxane units such as trifunctional aminoalkylsiloxane units (where $n=0$) with difunctional alkyl-, aryl, or mixed alkyl- and arylsiloxane units (where $c=2$). These copolymers can also contain various combined siloxane units; difunctional aminoalkylsiloxane units (where $n=1$) with trifunctional alkyl-, aryl- or mixed alkyl and arylsiloxane units (where $c=1$) or with difunctional alkyl-, aryl- or mixed alkyl- and arylsiloxane units (where $c=2$) or with any combination of these units so long as it contains at least one aminoalkylsiloxane unit of any type, that is, mono-, di-, or trifunctional. These copolymeric materials can be prepared by the cohydrolysis and co-condensation of the corresponding alkoxysilane compounds. Such copolymers can contain silicon-bonded alkoxy groups, or they can comprise essentially completely condensed materials.

The aminoalkylalkoxysilanes and aminoalkylpolysiloxanes as well as copolymers containing aminoalkylsiloxane and hydrocarbylsiloxane units can be prepared by disclosed methods known to those in the art.

The aldehydes or ketones containing a heterocyclic group that are useful in producing the compositions of this invention are those of the formula:

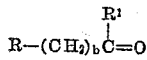

wherein R and R¹ have the above-defined meanings. These aldehydes and ketone starting materials are known and can be prepared by known methods.

The compositions of my invention are produced by forming a mixture of an organosilicon compound containing an aminoalkylsilyl group with an aldehyde or ketone containing a heterocyclic group as depicted above and maintaining the mixture at a temperature at which the organosilicon compound containing an aminoalkylsilyl grouping and the aldehyde or ketone react. There results, or is produced, water and an organosilicon compound containing an N-(heterocyclic substituted alkylidene)aminoalkylsilyl grouping wherein said amino group is interconnected to a silicon atom through at least three carbon atoms. The alkylidene group attached to the nitrogen group, when an aldehyde is used, is an alkyl group which contains, as a substituent, a heterocyclic group. When a ketone as depicted above is used, the alkylidene group contains, as a substituent, the heterocyclic grouping depicted above and a hydrocarbyl group.

The relative amounts of the organosilicon compounds containing an aminoalkylsilyl grouping and the aldehyde or ketone starting materials is not narrowly critical and can be varied over a wide range. A ratio of amino nitrogen of the organosilicon compound containing the aminoalkylsilyl grouping to carbonyl group of the aldehyde or ketone of at least 1 to 1 is advantageous and it is preferred to use a ratio of at least 1 to 2. No commensurate advantage is gained by using relative amounts other than those described above.

The temperature at which the reaction takes place also is not narrowly critical and can vary from as low as 0° C. to as high as 250° C. It is preferred, however, to carry out the reaction at a temperature of from about 5° C. to 150° C.

The reaction is preferably carried out in a suitable solvent in which both the organosilicon compound containing the aminoalkylsilyl grouping and the aldehyde or ketone are soluble, said solvent being non-reactive therewith. Where the organosilicon compound containing the aminoalkylsilyl grouping also contains alkoxy groups, solvents that are miscible with water are preferred, for example, cyclic ethers such as tetrahydrofuran and dioxane and compounds that are represented by the formula $R^4O(CH_2CH_2O)_wH$ and wherein $R^4$ is an alkyl group that contains from 1 to 6 carbon atoms and $w$ is an integer of from 1 to 2, since said water miscible solvents minimize the hydrolysis of said alkoxy groups by the water formed in the reaction. When the organosilicon compound containing an aminoalkylsilyl grouping is a polysiloxane, solvents which are not miscible with water are preferred, such as benzene, toluene, xylene and the like, although the cyclic ethers and other non-reactive solvents described above can be employed, the particular solvent being solely within the selection of one skilled in the art. Solvents that are not miscible with water are particularly useful where siloxanes are used, since the water of reaction can then be easily separated as an azeotrope with these solvents. However, any suitable solvent can be used.

The amount of the solvent within which the reaction is carried out, is not narrowly critical and can be easily determined by one skilled in the art. Amounts of such solvents of from 10 parts to about 400 parts by weight of the organosilicon compound containing the aminoalkylsilyl and the aldehyde or ketone starting materials can be employed. It is preferred to use such solvents in amounts of from 20 parts to 100 parts by weight of the starting materials. Amounts of such solvents other than those described can be used, but no commensurate advantage is gained thereby.

As has been described above, a byproduct of the reaction, as shown in Equation 1, is water. This water is preferably removed from the reaction mixture, as by azeotropic distillation by adding thereto a solvent of the above-described type that not only is a solvent for the starting materials, but also forms an azeotrope with water. The water can be separated from the solvent and the solvent returned to the reaction mixture. The water can also be removed by heating the reaction mixture to a temperature sufficiently elevated to vaporize the water or by adding a hydrophilic absorbent or adsorbent to the reaction mixture.

The compounds of this invention are particularly useful as sunscreen agents as well as ultraviolet absorbing agents. The compounds of this invention are also useful as starting materials in the production of substituted aminoalkylsilicon compounds as described and claimed in U.S. application Serial No. 744,936 concurrently filed herewith.

The following examples illustrate my invention:

Example I

Into a 1-liter, three-necked flask equipped with addition funnel, magnetic stirrer, and thermometer were placed Gamma-aminopropyltriethoxysilane (221.0 g., 1.0 mole), and tetrahydrofuran (250 ml.). The contents of the flask was chilled to about 5° C. by means of an ice bath and furaldehyde (96 g., 1.0 mole) added dropwise through the addition funnel with good stirring. The addition was completed over a 2 hr. period and was so regulated that the temperature of the reaction mixture did not rise above 40° C. The contents were stirred an additional 2 hrs. Tetrahydrofuran and other volatiles were then removed through a 10-in. insulated Vigreaux column to a maximum pot temperature of 225° C. over about a 4 hr. period. The residue was chilled to room temperature and distilled in vacuo through a 10-in. insulated Vigreaux column. Gamma-N-(2-furylmethylidene)aminopropyltriethoxysilane

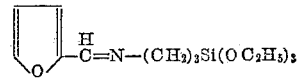

(B.P. 184–189 (20 mm. Hg.)$n_D^{25}$=1.4738) was recovered and gave the following analysis:

Calculated for $C_{14}H_{25}O_4SiN$: C, 56.2; H, 8.3; Si, 9.4. Found: C, 55.4; H, 7.9; Si, 9.4.

The structure was verified by infrared analysis.

Example II

Gamma-aminopropyltriethoxysilane (221 g., 1.0 mole) was reacted with 2-formyl pyridine (107 g., 1.0 mole) using methyl "Carbitol" (diethylene glycol monomethyl ether) (250 ml.) as the solvent and employing the same procedure described in Example I. After addition, the reaction mixture was stirred an additional 2 hrs. and methyl "Carbitol" and other volatiles removed through a 10-in. insulated Vigreaux column to a maximum pot temperature at 225° C. over a 4-hr. period. Gamma-N-(pyridylmethylidene)aminopropyltriethoxysilane

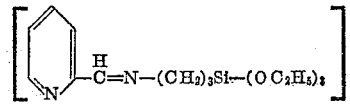

was recovered.

Example III

Gamma-aminopropylmethyldiethoxysilane (191 g., 1.0 mole), was reacted with 3-acetyl indazyl (182 g., 1.0 mole) using diethylene glycol monobutyl ether (250 ml.) as the solvent and employing the procedure described in Example I. Gamma-N-(3-indazyl(methyl)methylidene)-aminopropylmethyldiethoxysilane

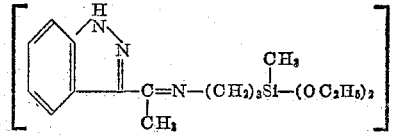

was recovered.

Example IV

Delta-aminobutylmethyl cyclotetrasiloxane (52 g., 0.1 mole) was reacted with 3-formyl-7-methyl indole (16 g., 0.1 mole) using diethylene glycol monobutyl ether (250 ml.) as the solvent and employing the procedure described in Example I.

Tetra-[delta-N-(7-methyl-3-indolylmethylidene)aminobutyl]tetramethylcyclotetrasiloxane

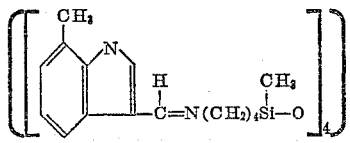

was recovered.

Example V

Eighty-two and a half grams of a dimethylsilicone oil containing 10 wt.-percent of combined delta-aminobutylmethylsiloxy units and which had the average formula:

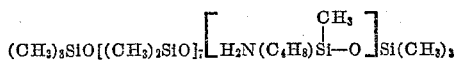

was reacted with 2-acetyl coumarone (16 g., 0.1 mole) without the use of a solvent and employing the procedure described in Example I. The mixture became cloudy upon heating after the addition. When the water formed during the reaction was removed, the oil product became clear and transparent. A dimethylsilicone oil containing approximately 10 wt.-percent of combined delta-N-[benzofuryl(methyl)methylidene]aminobutylmethylsiloxy units and having the average formula:

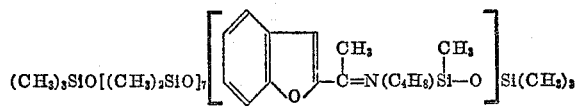

was obtained.

Example VI

Eighty-two and a half grams of a dimethylsilicone oil containing 10 wt.-percent of combined delta-aminobutylmethylsiloxy units and having the average formula:

was reacted with 9-formylacridine (20.7 g., 0.1 mole) using diethylene glycol monomethyl ether (250 ml.) as the solvent and employing the procedure described in Example I. The mixture was homogeneous throughout the addition and became amber colored upon heating. A dimethylsilicone oil containing approximately 10 wt.-percent of combined delta-N-(9-acridinylmethylidene)aminobutylmethylsiloxy units and having the average formula:

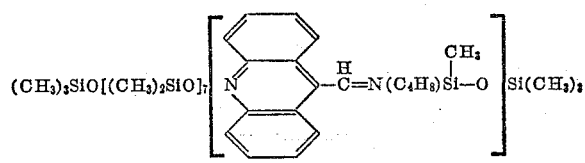

was obtained.

Example VII

Omega-aminoundecyltriethoxysilane can be reacted with 3-formylpyrazole according to the procedure described in Example I to yield omega-N-[3-pyrazolylmethylidene]aminoundecyltriethoxysilane.

Example VIII

Gamma-aminopropyldimethylethoxysilane can be reacted with 3-formylpyran according to the procedures described in the previous examples to yield gamma-N-(3-pyranylmethylidene)aminopropyldimethylethoxysilane.

Example IX

Delta-aminobutylphenyldibutoxysilane can be reacted with 5-formyloxazole according to the procedures described in the previous examples to yield delta-N-(5-oxazolylmethylidene)aminobutylphenyldibutoxysilane.

Example X

Gamma-aminopropylmethyldiethoxysilane can be reacted with 3-acetylpyrazole according to the procedures described in the previous examples to yield gamma-N-[3-pyrazolyl (methyl) methylidene] aminopropylmethyldiethoxysilane.

Example XI

Gamma-aminopropylpentamethylcyclotrisiloxane can be reacted with 3-formylbenzisoxazole according to the procedure described in the previous examples to yield gamma - N - (3-benzisoxazolylmethylidene)aminopropylpentamethylcyclotrisiloxane.

Example XII

Delta-aminobutylnonamethylcyclopentasiloxane can be reacted with 2-acetyl-paradioxin according to the procedures described in the previous examples to yield delta-N - [2 - paradioxinyl(methyl)methylidene]aminobutylnonamethylcyclopentasiloxane.

Example XIII

A phenylmethylsilicone oil containing combined gamma-aminopropylmethylsiloxy units can be reacted with 2-acetylnaphthyridine according to the procedure described in the previous examples to yield a phenylmethylsilicone oil containing combined gamma-N-[2-naphthyridinyl(methyl)methylidene] aminopropylmethylsiloxy units.

What is claimed is:

1. An organosilane of the formula:

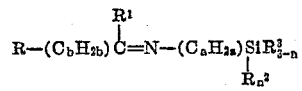

wherein R is a monovalent heterocyclic group selected from the class consisting of pyridyl, indolyl, acridinyl, pyrryl, piperidinyl, quinolinyl, furyl, benzofuryl, pyranyl, xanthyl, indazyl, pyrimidyl, pyrazyl, cinnolinyl, quinazolyl, phenazinyl, pyrazolyl, para-dioxin, 1,4-oxazinyl, benzoxazinyl, benzisoazolyl, benzisoxazolyl, oxazolyl, iso-oxazolyl, 1,2-benzopyranyl, naphthyridinyl, pyrido(3-2-b)-pyridinyl, carbazyl, pyridinyl and pyrazolyl groups, $R^1$ is a member of the group consisting of the hydrogen atom and a monovalent hydrocarbon radicals, $R^2$ is a member of the group consisting of the hydrogen atom and monovalent hydrocarbon radicals, $R^3$ is an alkoxy group, $a$ is an integer of from 3 to 19 inclusive, $b$ is an integer of from 0 to 3 inclusive, said heterocyclic group being interconnected to the $$-\overset{R^1}{\underset{}{C}}=$$

group by a carbon to carbon bond when $b$ is 0 and when $b$ is from 1 to 3 said heterocyclic group being interconnected to the $(C_bH_{2b})$ group through a carbon to carbon bond, and $n$ is an integer of from 0 to 2.

2. An organosiloxane consisting essentially of units of the formula:

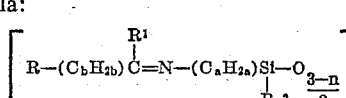

wherein R is a monovalent heterocyclic group selected from the class consisting of pyridyl, indolyl, acridinyl, pyrryl, piperidinyl, quinolinyl, furyl, benzofuryl, pyranyl, xanthyl, indazyl, pyrimidyl, pyrazyl, cinnolinyl, quinazolyl, phenazinyl, pyrazolyl, para-dioxin, 1,4-oxazinyl, benzoxazinyl, benzisoazolyl, benzisoxazolyl, oxazolyl, isooxazolyl, 1,2-benzopyranyl, naphthyridinyl, pyrido-(3-

2-b)-pyridinyl, carbazyl, pyridinyl and pyrazolyl groups, R¹ is a member of the group consisting of the hydrogen atom and monovalent hydrocarbon radicals, R² is a member of the group consisting of the hydrogen atom and monovalent hydrocarbon radicals, $a$ is an integer of from 3 to 19 inclusive, $b$ is an integer of from 0 to 3 inclusive, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond, and $n$ is an integer of from 0 to 2.

3. A cyclic organosiloxane of the formula:

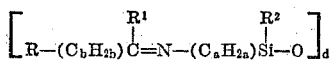

wherein R is a monovalent heterocyclic group selected from the class consisting of pyridyl, indolyl, acridinyl, pyrryl, piperidinyl, quinolinyl, furyl, benzofuryl, pyranyl, xanthyl, indazyl, pyrimidyl, pyrazyl, cinnolinyl, quinazolyl, phenazinyl, pyrazolyl, para-dioxin, 1,4-oxazinyl, benzoxazinyl, benzisoazolyl, benzisoxazolyl, oxazolyl, isooxazolyl, 1,2-benzopyranyl, naphthyridinyl, pyrido-(3-2-b)-pyridinyl, carbazyl, pyridinyl and pyrazolyl groups, R¹ is a member of the group consisting of the hydrogen atom and monovalent hydrocarbon radicals, R² is a member of the group consisting of the hydrogen atom and monovalent hydrocarbon radicals, $a$ is an integer of from 3 to 19 inclusive, $b$ is an integer of from 0 to 3 inclusive, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond and $d$ is an integer of from 3 to 7.

4. A linear organosiloxane consisting essentially of units of the formula:

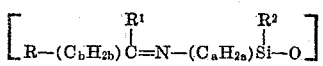

wherein R is a monovalent heterocyclic group selected from the class consisting of pyridyl, indolyl, acridinyl, pyrryl, piperidinyl, quinolinyl, furyl, benzofuryl, pyranyl, xanthyl, indazyl, pyrimidyl, pyrazyl, cinnolinyl, quinazolyl, phenazinyl, pyrazolyl, para-dioxin, 1,4-oxazinyl, benzoxazinyl, benzisoazolyl, benzisoxazolyl, oxazolyl, isooxazolyl, 1,2-benzopyranyl, naphthyridinyl, pyrido-(3-2-b)-pyridinyl, carbazyl, pyridinyl and pyrazolyl groups, R¹ is a member of the group consisting of the hydrogen atom and monovalent hydrocarbon radicals, R² is a member of the group consisting of the hydrogen atom and monovalent hydrocarbon radicals, $a$ is an integer of from 3 to 19 inclusive and $b$ is an integer of from 0 to 3 inclusive, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond.

5. An organosilicon compound consisting essentially of units of the formulas:

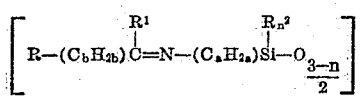

and

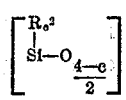

wherein R is a monovalent heterocyclic group selected from the class consisting of pyridyl, indolyl, acridinyl, pyrryl, piperidinyl, quinolinyl, furyl, benzofuryl, pyranyl, xanthyl, indazyl, pyrimidyl, pyrazyl, cinnolinyl, quinazolyl, phenazinyl, pyrazolyl, para-dioxin, 1,4-oxazinyl, benzoxazinyl, benzisoazolyl, benzisoxazolyl, oxazolyl, isooxazolyl, 1,2-benzopyranyl, naphthyridinyl, pyrido-(3-2-b)-pyridinyl, carbazyl, pyridinyl and pyrazolyl groups, R¹ is a member of the group consisting of the hydrogen atom and monovalent hydrocarbon radicals, R² is a member of the group consisting of the hydrogen atom and monovalent hydrocarbon radicals, $a$ is an integer of from 3 to 19 inclusive and $b$ is an integer of from 0 to 3 inclusive, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond, $n$ is an integer of from 0 to 2, $c$ is an integer of from 0 to 3.

6. An organosiloxane of the formula:

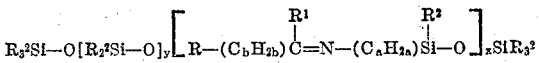

wherein R is a monovalent heterocyclic group selected from the class consisting of pyridyl, indolyl, acridinyl, pyrryl, piperidinyl, quinolinyl, furyl, benzofuryl, pyranyl, xanthyl, indazyl, pyrimidyl, pyrazyl, cinnolinyl, quinazolyl, phenazinyl, pyrazolyl, para-dioxin, 1,4-oxazinyl, benzoxazinyl, benzisoazolyl, benzisoxazolyl, oxazolyl, isooxazolyl, 1,2-benzopyranyl, naphthyridinyl, pyrido-(3-2-b)-pyridinyl, carbazyl, pyridinyl and pyrazolyl groups, R¹ is a member of the group consisting of the hydrogen atom and monovalent hydrocarbon radicals, R² is a member of the group consisting of the hydrogen atom and monovalent hydrocarbon radicals, $a$ is an integer of from 3 to 19 inclusive and $b$ is an integer of from 0 to 3 inclusive, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond, $y$ is an integer and $x$ is an integer of at least 1.

7. Gamma - N - (3-furylmethylidene)aminopropyltriethoxysilane.

8. Gamma - N-(2-pyridylmethylidene)aminopropyltriethoxysilane.

9. Gamma - N-[3-methylindazyl(methyl)methylidene] aminopropylmethyldiethoxysilane.

10. Tetra - [delta-N-(7-methyl-3-indolylmethylidene)-aminobutyl]tetramethylcyclotetrasiloxane.

11. An organosiloxane of the formula:

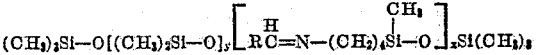

wherein R represents a benzofuryl group, $y$ is an integer and $x$ is an integer of at least 1.

12. An organosiloxane of the formula:

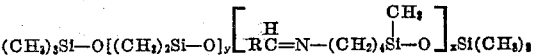

wherein R represents an acridinyl group, $y$ is an integer of at least 0 and $x$ is an integer of at least 1.

13. A process as claimed in claim 16 wherein the temperature is from 5° C. to 250° C.

14. An organosilicon compound selected from the class consisting of:

(A) organosilanes of the formula:

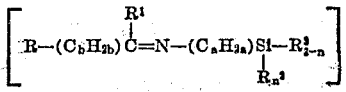

wherein R is a monovalent heterocyclic group selected from the class consisting of pyridyl, indolyl, acridinyl, pyrryl, piperidinyl, quinolinyl, furyl, benzofuryl, pyranyl, xanthyl, indazyl, pyrimidyl, pyrazyl, cinnolinyl, quinazolyl, phenazinyl, pyrazolyl, para-dioxin, 1,4-oxazinyl, benzoxazinyl, benzisoazolyl, benzisoxazolyl, oxazolyl, iso-oxazolyl, 1,2-benzopyranyl, naphthyridinyl, pyrido(3-2-b)-pyridinyl, carbazyl, pyridinyl and pyrazolyl groups, $R^1$ is a member of the group consisting of the hydrogen atom and monovalent hydrocarbon radicals, $R^2$ is a member of the group consisting of the hydrogen atom and monovalent hydrocarbon radicals, $R^3$ is an alkoxy group, $a$ is an integer of from 3 to 19 inclusive, $b$ is an integer of from 0 to 3 inclusive, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, and n is an integer of from 0 to 2 inclusive, (B) organosiloxanes consisting essentially of units of the formula:

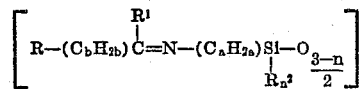

wherein R, $R^1$, $R^2$, $a$, $b$ and $n$ are as above-defined and (C) organosiloxanes consisting essentially of the units as defined in (B) and units of the formula:

wherein $R^2$ is as above-defined and $c$ is an integer of from 0 to 3.

15. A process for producing organosilicon compounds selected from the class consisting of:

(A) organosilanes of the formula:

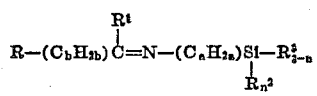

wherein R is a monovalent heterocyclic group selected from the class consisting of pyridyl, indolyl, acridinyl, pyrryl, piperidinyl, quinolinyl, furyl, benzofuryl, pyranyl, xanthyl, indazyl, pyrimidyl, pyrazyl, cinnolinyl, quinazolyl, phenazinyl, pyrazolyl, para-dioxin, 1,4-oxazinyl, benzoxazinyl, benzisoazolyl, benzisoxazolyl, oxazolyl, iso-oxazolyl, 1,2-benzopyranyl, naphthyridinyl, pyrido(3-2-b)-pyridinyl, carbazyl, pyridinyl and pyrazolyl groups, $R^1$ is a member of the group consisting of the hydrogen atom and monovalent hydrocarbon radicals, $R^2$ is a member of the group consisting of the hydrogen atom and monovalent hydrocarbon radicals, $R^3$ is an alkoxy group, $a$ is an integer of from 3 to 19 inclusive, $b$ is an integer of from 0 to 3 inclusive, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, and $n$ is an integer of from 0 to 2 inclusive, (B) organosiloxanes consisting essentially of units of the formula:

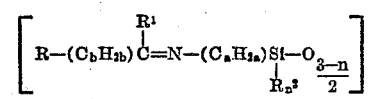

wherein R, $R^1$, $R^2$, $a$, $b$ and $n$ are as above-defined, and (C) organosiloxanes consisting essentially of the units as defined in (B) and units of the formula:

wherein $R^2$ is as above-defined and $c$ is an integer of from 0 to 3, which comprises forming a mixture of an organosilicon compound containing an aminoalkylsilyl grouping, said organosilicon compound being selected from the class consisting of:

(D) aminoalkylsilanes of the formula:

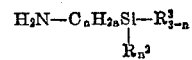

wherein $R^2$, $R^3$, $a$ and $n$ are as above-defined, (E) aminoalkylsiloxanes consisting essentially of units of the formula:

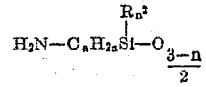

wherein $R^2$, $a$ and $n$ are as above-defined and (F) aminoalkylsiloxanes consisting essentially of units as defined in (E) and units of the formula:

wherein $R^2$ and $c$ are as above-defined; and a carbonyl compound of the formula:

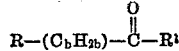

wherein R and $b$ are as above-defined and $R^1$ is a member of the group consisting of the hydrogen atom and monovalent hydrocarbon radicals whereby said carbonyl compound and said organosilicon compound containing an aminoalkylsilyl grouping react to produce an organosilicon compound containing a N-(heterocyclic substituted alkylidene)aminoalkylsilyl grouping.

16. A process for producing organosilicon compounds selected from the class consisting of:

(A) organosilanes of the formula:

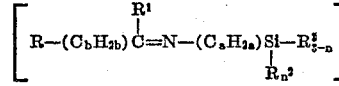

wherein R is a monovalent heterocyclic group selected from the class consisting of pyridyl, indolyl, acridinyl, pyrryl, piperidinyl, quinolinyl, furyl, benzofuryl, pyranyl, xanthyl, indazyl, pyridmidyl, pyrazyl, cinnolonyl, quinazolyl, phenazinyl, pyrazolyl, para-dioxin, 1,4-oxazinyl, benzoxazinyl, benzisoazolyl, benzisoxazolyl, oxazolyl, iso-oxazolyl, 1,2-benzopyranyl, naphthyridinyl, pyrido(3-2-b)-pyridinyl, carbazyl, pyridinyl and pyrazolyl groups, $R^1$ is a member of the group consisting of hydrogen and monovalent hydrocarbon radicals, $R^2$ is a member of the group consisting of the hydrogen atom and monovalent hydrocarbon radicals, $R^3$ is an alkoxy group, $a$ is an integer of from 3 to 19 inclusive, $b$ is an integer of from 0 to 3 inclusive, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, and $n$ is an integer of from 0 to 2 inclusive, (B) organosiloxanes consisting essentially of units of the formula:

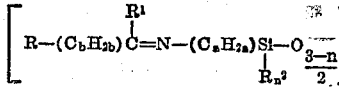

wherein R, R¹, R², $a$, $b$ and $n$ are as above-defined and
(C) organosiloxanes consisting essentially of the units as defined in (B) and units of the formula:

wherein R² is as above-defined and $c$ is an integer of from 0 to 3; which comprises forming a mixture of an organosilicon compound containing an aminoalkylsilyl grouping, said organosilicon compound being selected from the class consisting of:

(D) aminoalkylsilanes of the formula:

wherein R², R³, $a$ and $n$ are as above-defined and
(E) aminoalkylsiloxanes consisting essentially of units of the formula:

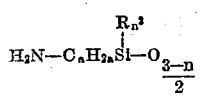

wherein R², $a$ and $n$ are as above-defined and
(F) aminoalkylsiloxanes consisting essentially of units as defined in (E) and units of the formula:

wherein R² and $c$ are as above-defined; and a carbonyl compound of the formula:

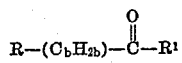

wherein R and $b$ are as above-defined and R¹ is a member of the group consisting of the hydrogen atom and monovalent hydrocarbon radicals and maintaining said mixture at a temperature at which said carbonyl compound and said organosilicon compound containing an aminoalkylsilyl grouping react to produce said organosilicon compound containing a N-(heterocyclic substituted alkylidene)aminoalkylsilyl grouping.

17. A process for producing organosilicon compounds selected from the class consisting of:
(A) organosilanes of the formula:

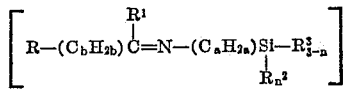

wherein R is a monovalent heterocyclic group selected from the class consisting of pyridyl, indolyl, acridinyl, pyrryl, piperidinyl, quinolinyl, furyl, benzofuryl, pyranyl, xanthyl, indazyl, pyrimidyl, pyrazyl, cinnolinyl, quinazolyl, phenazinyl, pyrazolyl, para-dioxin, 1,4-oxazinyl, benzoxazinyl, benzisoazolyl, benzisoxazolyl, oxazolyl, isooxazolyl, 1,2-benzopyranyl, naphthyridinyl, pyrido(3-2-b)-pyridinyl, carbazyl, pyridinyl and pyrazolyl groups, R¹ is a member of the group consisting of monovalent hydrocarbon radicals, R² is a member of the hydrogen atom and the group consisting of hydrogen and monovalent hydrocarbon radicals, R³ is an alkoxy group, $b$ is an integer of from 3 to 19 inclusive, $b$ is an integer of from 0 to 3 inclusive, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, and $n$ is an integer of from 0 to 2 inclusive,
(B) organosiloxanes consisting essentially of units of the formula:

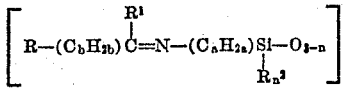

wherein R, R¹, R², $a$, $b$ and $n$ are as above-defined and;
(C) organosiloxanes consisting essentially of the units as defined in (B) and units of the formula:

wherein R² is as above-defined and $c$ is an integer of from 0 to 3; which comprises forming a mixture of an organosilicon compound containing an amino alkylsilyl grouping, said organosilicon compound being selected from the class consisting of:

(D) aminoalkylsilanes of the formula:

wherein R², R³, $a$ and $n$ are as above-defined and
(E) aminoalkylsiloxanes consisting essentially of units of the formula:

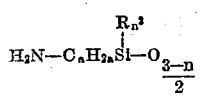

wherein R², $a$ and $n$ are as above-defined and
(F) aminoalkylsiloxanes consisting essentially of units as defined in (E) and units of the formula:

wherein R² and $c$ are as above-defined; and a carbonyl compound of the formula:

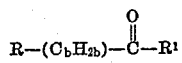

wherein R and $b$ are as above-defined and R¹ is a member of the group consisting of the hydrogen atom and monovalent hydrocarbon radicals and a solvent and maintaining said mixture at a temperature at which said carbonyl compound and said organosilicon compound containing an aminoalkylsilyl grouping react to produce said organosilicon compound containing a N-(heterocyclic substituted alkylidene) aminoalkylsilyl grouping.

No references cited.

UNITED STATES PATENT OFFICE
CERTIFICATION OF CORRECTION

Patent No. 3,022,270                                   February 20, 1962

Robert J. Lisanke

It is hereby certified that error appears in the above numbered patent requiring correction and that the said Letters Patent should read as corrected below.

Column 3, lines 48 to 51, the lower right-hand portion of equation (1) should appear as shown below instead of as in the patent:

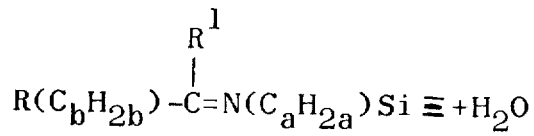

column 12, line 52, for "cinnolonyl" read -- cinnolinyl --; column 13, line 60, after "consisting of" insert -- the hydrogen atom and --; lines 61 and 62, strike out "hydrogen atom and the".

Signed and sealed this 23rd day of October 1962.

(SEAL)
Attest:

ERNEST W. SWIDER                                           DAVID L. LADD
Attesting Officer                                           Commissioner of Patents